Patented Sept. 5, 1922.

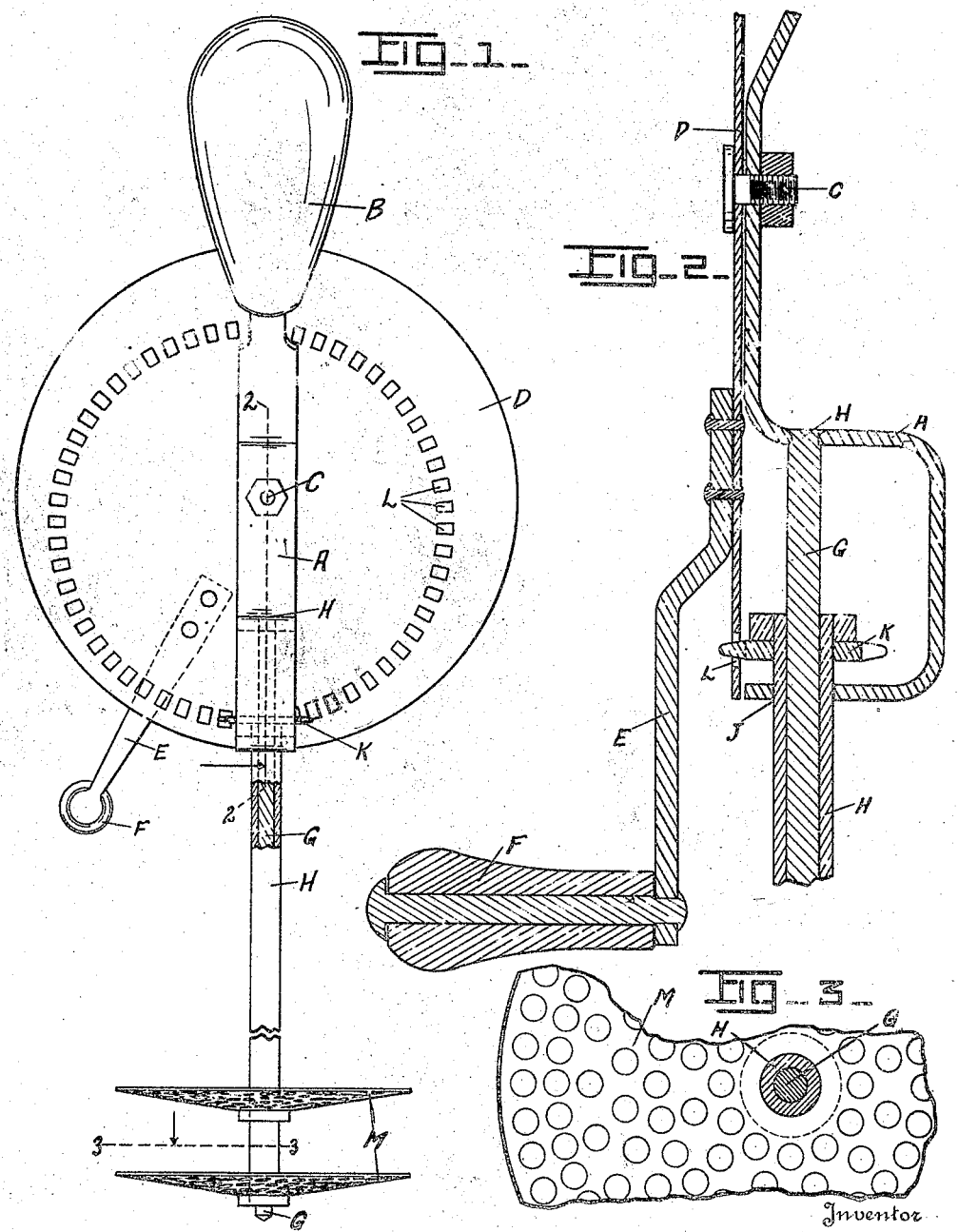

1,427,986

UNITED STATES PATENT OFFICE.

JOHN H. VINER, OF MINNEAPOLIS, MINNESOTA.

CREAM AND EGG WHIPPER.

Application filed January 13, 1922. Serial No. 529,034.

*To all whom it may concern:*

Be it known that I, JOHN H. VINER, a citizen of the United States, residing at Minneapolis, in the county of Hennepin and State of Minnesota, have invented certain new and useful Improvements in Cream and Egg Whippers, of which the following is a specification.

This invention relates to kitchen utensils and the main object is to provide an efficient, practical and simply constructed device for mixing or whipping such liquid substances as eggs, cream, icing, etc. Further objects will be disclosed in the course of the following specification and are illustrated in the accompanying drawing, in which:

Fig. 1 is an elevation of my device, fragmentary portions thereof being broken away for illustration purposes.

Fig. 2 is an enlarged detail sectional view on the line 2—2 in Fig. 1, but showing the crank E has hanging straight down.

Fig. 3 is an enlarged sectional detail showing a fractional part of one of the mixing disks, as seen on the line 3—3 in Fig. 1.

Referring to the drawing by reference characters A designates a frame, having a handle B, and to which is pivotally secured, as at C, a plate D having a turning crank E with a handle F. A rod G extends down from a point H where it is rigidly secured to the frame A. A sleeve H is rotatable and longitudinally slidable on the rod G and is guided as at J in the lower end of the frame A. Rigidly mounted on the upper end of the sleeve H is a small pinion K whose teeth mesh with a circular row of small openings or slots L in the plate D. The circular row of slots L, as may be noted in Fig. 1, is formed in eccentric relation with the center C of the plate D. Therefore, when the plate D is rotated, by the crank E, the pinion K will follow the run of the slots L, with the result that the mixing disks M, which are secured to the lower end of the sleeve H, will move up and down as well as rotate.

The lower end of the rod G extends just below the lowest position of the lower disk M so that when the device is being used said lower rod end may be braced against the inner center of the disk in which the mixing is done.

With the device as above described in operation it is found that because of the double action of the mixers M they are capable of functioning many times more efficiently than where only a rotating motion is produced, as in older and well known types now so universally used.

It is understood that suitable modifications may be made in the form and structure of this device, provided, however, that such modifications come within the spirit and scope of the appended claims.

Having now therefore fully shown and described my invention, what I claim to be new and desire to protect by United States Letters Patent is:

1. A device of the class described consisting of a suitable frame, a plate pivotally mounted thereon and adapted to be rotated, said plate having a circular row of slots eccentric with relation to its pivot, a vertical member rotatable and vertically slidable in the frame, said member having an agitating element at its lower end, and a pinion at the upper end of said vertical member, said pinion meshing with said eccentric row of slots.

2. A device of the class described consisting of a suitable frame, a plate rotatably mounted on the frame, said plate having a circular row of perforations positioned in eccentric relation with its turning center, a pinion, rotatably and slidably mounted in the frame, meshing with said perforations, and an agitating element connected with and driven by said pinion.

3. A device of the class described consisting of a frame, a plate rotatably mounted on the frame and having therein an eccentric row of perforations, a vertical rod secured at its upper end in the frame, a sleeve rotatably and slidably mounted on the rod, said sleeve having an agitating element at its lower end, a pinion at the upper end of the sleeve, said pinion meshing with said perforations.

4. A device of the class described consisting of a frame, a plate rotatably mounted on the frame and having therein an eccentric row of perforations, a vertical rod secured at its upper end in the frame, a sleeve rotatably and slidably mounted on the rod, said sleeve having an agitating element at its lower end, a pinion at the upper end of the sleeve, said pinion meshing with said perforations, and said rod extending with its lower end slightly below the lower end of the sleeve.

In testimony whereof I affix my signature.

JOHN H. VINER.